United States Patent
Dehghani et al.

(10) Patent No.: US 11,627,361 B2
(45) Date of Patent: Apr. 11, 2023

(54) METHOD TO ACOUSTICALLY DETECT A STATE OF AN EXTERNAL MEDIA DEVICE USING AN IDENTIFICATION SIGNAL

(71) Applicant: Meta Platforms, Inc., Menlo Park, CA (US)

(72) Inventors: Pejman Dehghani, Mountain View, CA (US); Sridhar Pilli, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 137 days.

(21) Appl. No.: 16/984,519

(22) Filed: Aug. 4, 2020

(65) Prior Publication Data

US 2021/0112298 A1    Apr. 15, 2021

Related U.S. Application Data

(60) Provisional application No. 62/914,802, filed on Oct. 14, 2019, provisional application No. 62/963,458, filed on Jan. 20, 2020.

(51) Int. Cl.
| | | |
|---|---|---|
| *H04N 21/478* | (2011.01) | |
| *H04N 21/41* | (2011.01) | |
| *H04N 21/4363* | (2011.01) | |
| *H04R 3/00* | (2006.01) | |

(52) U.S. Cl.
CPC ............ *H04N 21/4104* (2013.01); *H04N 21/43635* (2013.01); *H04N 21/478* (2013.01); *H04R 3/005* (2013.01)

(58) Field of Classification Search
None
See application file for complete search history.

(56) References Cited

U.S. PATENT DOCUMENTS

| | | | |
|---|---|---|---|
| 9,728,205 B2* | 8/2017 | Bilobrov | G10L 25/54 |
| 2006/0100885 A1* | 5/2006 | Oh | G10L 21/04 |
| | | | 704/503 |
| 2009/0307061 A1* | 12/2009 | Monighetti | G06Q 30/02 |
| | | | 705/50 |
| 2010/0119208 A1* | 5/2010 | Davis | H04H 60/61 |
| | | | 707/E17.001 |
| 2010/0205628 A1* | 8/2010 | Davis | H04N 21/478 |
| | | | 455/414.1 |

(Continued)

OTHER PUBLICATIONS

PCT International Search Report and Written Opinion, PCT Application No. PCT/US2020/052743, dated Dec. 11, 2020, eight pages.

(Continued)

*Primary Examiner* — William J Kim
(74) *Attorney, Agent, or Firm* — Fenwick & West LLP

(57) ABSTRACT

A communication system detects a state of a connected television. The communication system receives a request to establish a communication session with a local communication device via a network. The communication system outputs a reference audio signal to a locally connected audio output device. The communication system captures an ambient audio signal from a local microphone and compares the reference audio signal and the ambient audio signal to determine if the reference audio signal and the ambient audio signal match by meeting a similarity threshold. initiates an action with respect to the communication session based on the comparison.

11 Claims, 5 Drawing Sheets

(56) References Cited

U.S. PATENT DOCUMENTS

| | | | | |
|---|---|---|---|---|
| 2011/0035373 A1* | 2/2011 | Berg | ................... | G06F 16/7834 |
| | | | | 707/723 |
| 2011/0055347 A1* | 3/2011 | Hu | ....................... | H04N 21/222 |
| | | | | 709/217 |
| 2011/0224992 A1* | 9/2011 | Chaoui | ................. | G10L 19/018 |
| | | | | 704/500 |
| 2012/0059495 A1* | 3/2012 | Weiss | .................... | G06F 16/433 |
| | | | | 700/94 |
| 2012/0059845 A1* | 3/2012 | Covell | ................... | H04N 5/445 |
| | | | | 707/769 |
| 2014/0277640 A1* | 9/2014 | Bilobrov | ................ | G10L 25/54 |
| | | | | 700/94 |
| 2016/0112522 A1* | 4/2016 | Abello | .................... | H04L 67/18 |
| | | | | 709/224 |
| 2016/0295279 A1* | 10/2016 | Srinivasan | ............ | G10L 19/018 |
| 2017/0332126 A1* | 11/2017 | Davis | ................... | H04N 21/472 |

OTHER PUBLICATIONS

International Preliminary Report on Patentability for International Application No. PCT/US2020/052743, dated Apr. 28, 2022, 7 pages.

* cited by examiner

METHOD TO ACOUSTICALLY DETECT A STATE OF AN EXTERNAL MEDIA DEVICE USING AN IDENTIFICATION SIGNAL

CROSS-REFERENCE TO RELATED APPLICATIONS

This application claims the benefit of U.S. Provisional Application No. 62/914,802 filed on Oct. 14, 2019 and U.S. Provisional Application No. 62/963,458 filed on Jan. 20, 2020, which are incorporated by reference herein.

BACKGROUND

A communication system may connect to an input port of a television to enable the television to output video and audio during a communication session. If the television is configured to output from a different port than the port connected to the communication system, the communication system may continue to transmit signals for the communication session without the television outputting the video or audio. Thus, a local user may be unaware that a communication session is in progress.

SUMMARY

This disclosure relates generally to a communication system, and, more specifically, to a communication system that detects if a connected television is off or connected to a different input.

In one embodiment, the communication system establishes a communication session between a local communication device and a remote client device via a network. In particular, the communication system outputs a reference audio signal to a locally connected audio output device. The communication system obtains an ambient audio signal from a local microphone, and compares the reference audio signal and the ambient audio signal to determine if the reference audio signal and the ambient audio signal match by meeting a similarity threshold. In response to the reference audio signal and the ambient audio signal not matching, the communication system may take action with respect to the communication session.

In another embodiment, the communication system may obtain and compare a network audio signal received by a remote client device to an ambient audio signal outputted at front end user's location to determine if a television is outputting signals for a communication session. In particular, the communication system receives the network audio signal from the remote client device and sends the network audio signal to be emitted via the television. The communication system receives the ambient audio signal from the microphone at the front end user's location and compares the ambient audio signal to the network audio signal (or, collectively, audio signals). If the audio signals match, then the communication system may determine that the television is on and configured to output from the communication system. However, if the audio signals do not match, the communication system takes action with respect to the communication session, such as ending the communication session or generating an alert indicating that the communication session is ongoing.

In another embodiment, the communication system may obtain and compare a locally-generated identification audio signal to an ambient audio signal outputted at a front end user's location to determine if television is able to output audio signals for a communication session. In particular, the communication system generates and sends the identification audio signal to be emitted via the television. The communication system may send the identification audio signal during an ongoing communication session or before establishing a communication session. The communication system receives the ambient audio signal captured by the microphone at the front end user's location and compares the ambient audio signal to the identification audio signal (or, collectively, audio signals). If the audio signals match, then the communication system may determine that the television is appropriately configured to output audio signals from the communication system for a communication session. If the audio signals do not match, the communication system may use internal speakers to facilitate a communication session or, for an ongoing communication session, may take action to end the communication session or send an alert indicating that the communication session is ongoing.

In some embodiments, the communication system may compare the audio signals by performing a cross correlation on the audio signals to obtain a similarity measure and make a determination about the communication session based on the similarity measure. In another embodiment, the communication system may perform signal presence detection to determine if the identification audio signal is contained within the ambient audio signal, and take action if the identification audio signal is not detected.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
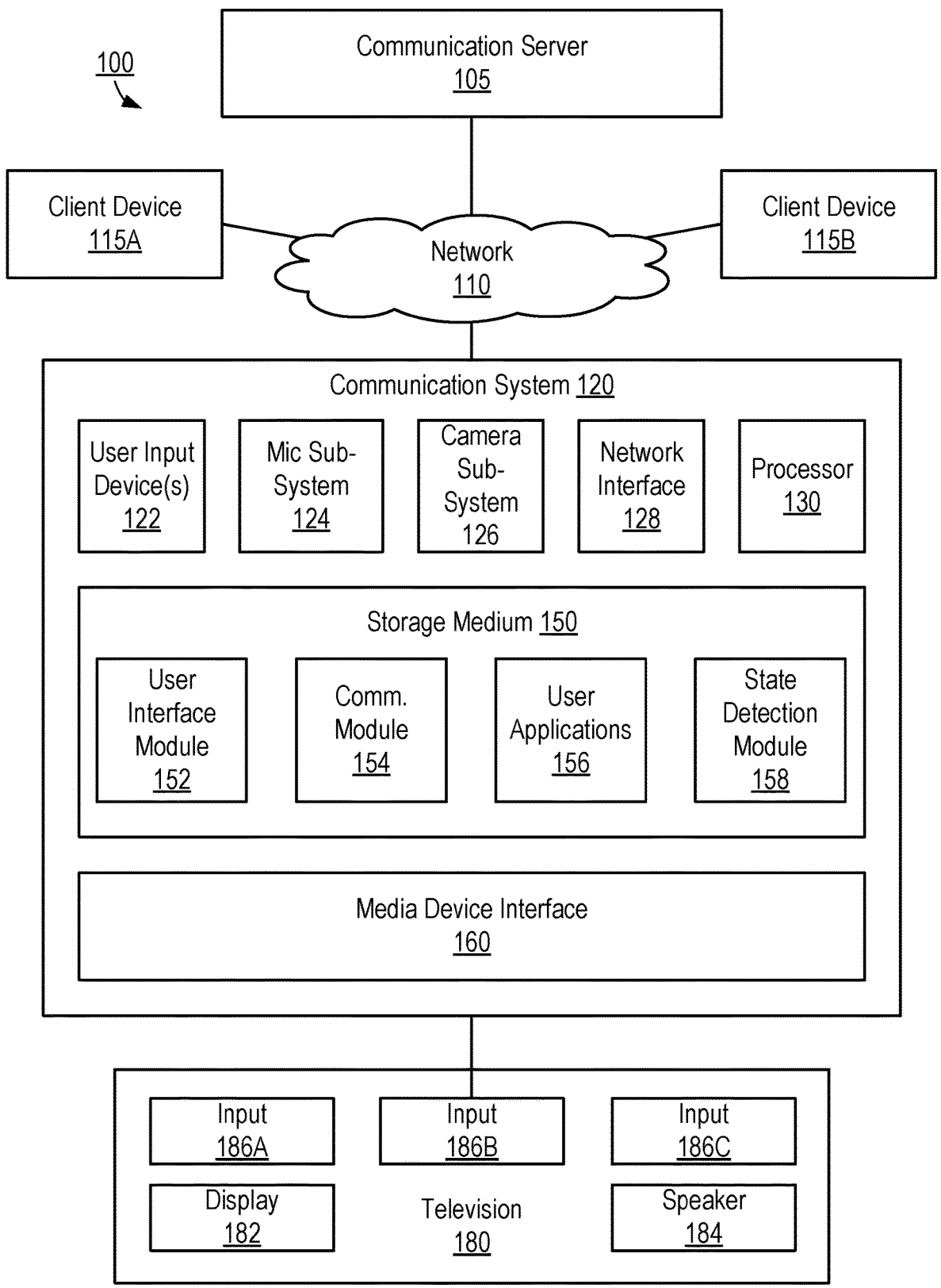
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises a computing device for coupling to an external media device such as a television or other external display and/or audio output system. In this embodiment, the communication system may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions or communication sessions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice call, video call, or other communication session is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, and a media device interface 160. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the user input device 122 is integrated with an internal display, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during a voice/video call or in a voice/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera subsystem 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The media device interface 160 comprises an interface to an electronic device for presenting images, video, and/or audio content. For example, the media device interface 160 comprises one or more ports (e.g., an HDMI port) that couples the communication system 120 to an external display device (e.g., a television) and/or external speakers. The external speakers may be integrated with the television or may comprise separate speakers.

In an embodiment, the communication system 120 may comprise an integrated display and/or integrated speakers in addition to the media device interface 160 connected to the external television 180.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, state detection module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications, and state detection module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The state detection module 158 determines a state of the connected television 180. The state of the television 180 may include settings, such as the input 186 being used by the television 180, and power mode (i.e., on or off). The state detection module is further described in relation to FIG. 3.

In the system environment of FIG. 1, the communication system 120 connects to a television 180 for visual display and audio output. The television 180 includes a display 182, a speaker 184, and a plurality of input ports 186 (e.g., input port 186A, 186B, 186C). The television 180 may receive audio and video signals from the communication system via one of the input ports 186, output the audio signals using the speaker 184, and output video signals using the display 182. For example, the communication system 120 may interface with the television 180 for various purposes including conducting voice/video calls, facilitating other communication sessions, displaying media content, and playing audio content, like music, podcasts, and alerts, among other functions. The input ports 186 may be wired ports such as a USB port, an HDMI port, an Ethernet port, etc. or wireless ports for communicating according to a wireless protocol such as Bluetooth, Wireless USB, Near Field Communication (NFC), etc. Different devices may be coupled to the television 180 via different ports 186. The television 180 can switch between different ports 186 as an input source to control which port 186 (and connected device) provides the audio and video signals to the television 180 for outputting.

The television 180 outputs audio and video signals based on its state (or internal settings) that includes a description of its input. For example, the television may output signals from the communication system when set to a HDMI1 and output signals from a cable provider when set to HDMI2.

Figure 2:
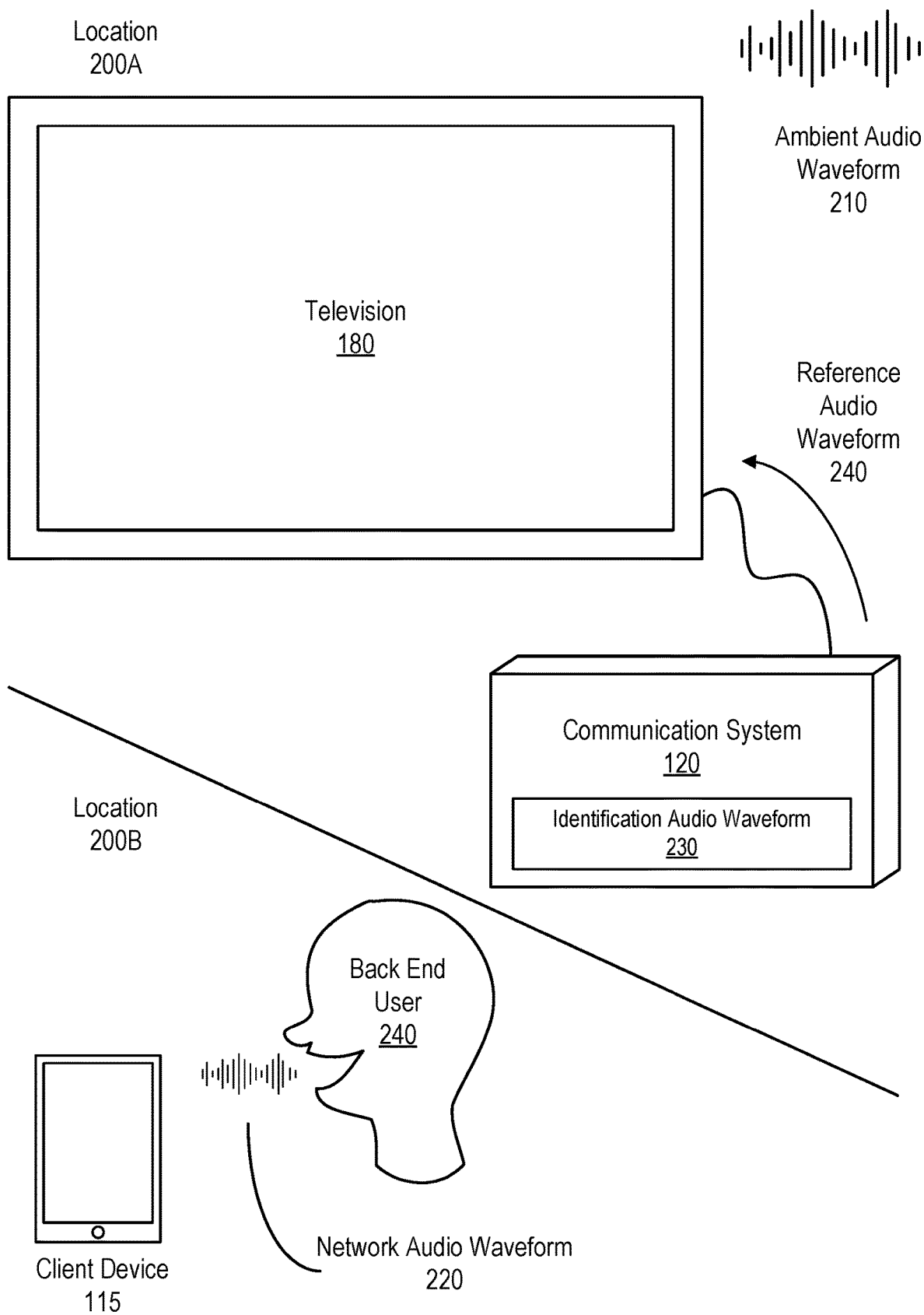
FIG. 2 is an example use case scenario of using the communication system to verify a state of a connected television, according to one embodiment.

FIG. 2 is an example use case scenario for using the communication system 120 to determine a state of a television 180, according to one embodiment. In this embodiment, the communication system 120 is facilitating a video call between a front end user at a first location 200A and a back end user 240 at a second location 200B. The communication system 120 is outputting video signals to the display 182 of the television 180 and audio signals via the speaker 184 of the television 180. The back end user 240 is conducting the video call via a client device 115. In other embodiments, the back end user 240 could be using a second communications system 120 or any other device capable of conducting a video call. Though this example is described in relation to a video call, the same process could be used for other communication sessions, such as a voice (or audio) call or interactions between a user and the virtual assistant.

To determine whether the video call is ongoing, the communication system 120 captures an ambient audio waveform 210 and compares it to a reference audio waveform 240 outputted to the television 180 to determine if they match, thus indicating that the television 180 is properly configured to facilitate the call of the communication system 120. The reference audio waveform 240 may be a network audio waveform 220 received by the communication system 120 over the network 110 (representing audio captured by the client device 115), a locally-generated identification audio waveform 230 (generated by the communication system 120), or a combination of the network audio waveform 220 and the identification audio waveform 230.

For example, in an embodiment that uses the network audio waveform 220 as the reference audio waveform 240, the communication system 120 obtains the network audio waveform 220 from the remote location 200B and compares it with the ambient audio waveform 210 from the location 200A. This network audio waveform 220 may include sounds from the back end user 240 or any other audible individuals or objects at the location 200B of the remote client device 115. In some embodiments, the communication system 120 may perform audio processing on the network audio waveform 220. The communication system 120 sends the network audio waveform 220 for output via the speaker 184 of (or an external speaker system connected to) the television 180. If the television 180 is on, the television 180 may output an ambient audio waveform 210 from its speaker 184 that may correspond to audio received at the current set input 186. The communication system 120 captures this ambient audio waveform 210 via the microphone subsystem 124 and compares it to the network audio waveform 220 using the state detection module 158. This comparison may involve further signal processing by the state detection module 158 and is further described in relation to FIG. 3.

In another embodiment, the communication system 120 uses a locally-generated identification audio waveform 230 as the reference audio waveform 240. This identification audio waveform 230 may have a unique audio signature and include a series of pulses at one or more tonal frequencies. In some embodiments, the communication system 120 generates the identification audio waveform 230 to blend into the sound of an ambient environment at the first location 200A. The communication system 120 sends the identification audio waveform 230 for output via the speaker 184 of the television 180 and compares the captured ambient audio waveform 210 to the identification audio waveform 230. The communication system 120 may send the identification audio waveform 230 for output during the video call, or, in some embodiments, may send the identification audio waveform 230 for output before establishing the video call (i.e., when a request for the video call is received). For example, the communication system 120 may send the identification audio waveform 230 for output before a communication session is established to determine whether the television 180 to properly configured to facilitate a communication session.

The comparison of the audio waveforms enables determination of a state of the television 180. If the reference audio waveform 240 and the ambient audio waveform 210 match, this is indicative of the being television 180 on and set to the input 186 connected to the communication system 120. If the reference audio waveform 240 and the ambient audio waveform 210 do not match (or meet a similarity threshold), television 180 may be off or may be connected to a different input than the input 186 connected to the communication system 120.

If the reference audio waveform 240 and the ambient audio waveform 210 do not match, the communication system 120 may take an action with respect to the video call. For example, if the video call is ongoing, the communication system 120 may end the video call or may send a message to a client device 115 associated with the front end user or through the display 182 of the television 180 requesting an input to continue the video call. In another example, if the communication system 120 sent the identification audio waveform 230 before establishing the video call, the communication system 120 may facilitate the video call using an integrated display and/or integrated speakers instead of sending the audio and video data to the television 180 when the reference audio waveform 240 and the ambient audio waveform 210 do not match. In some embodiments, the audio waveforms may not match due to a change in the input 186 of the television or the television 180 being turned off. For example, the communication system 120 may be connected to a first input 186A, and if the front end user switches the television 180 to watch a show using a cable provider system connected to a second input 186B, the communication system 120 may output the audio from the show and not output any audio for the video call. In other embodiments, if the audio waveforms match, the communications system 120 may continue to facilitate the video call or establish the video call.

Figure 3:
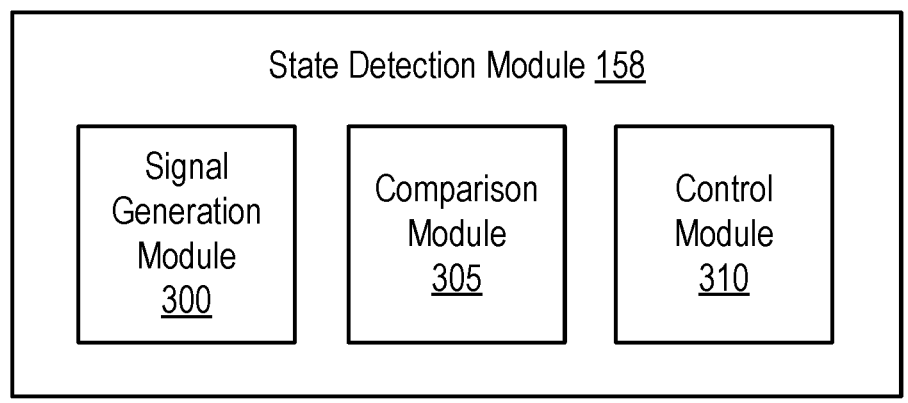
FIG. 3 is a block diagram of a state detection module, according to one embodiment.

FIG. 3 is a block diagram of the state detection module 158, according to one embodiment. The state detection module 158 includes a signal generation module 300, a comparison module 305, and a control module 310. The state detection module 158 may output a reference audio signal in the ambient environment around the communication system 120, determine the state of the television 180 based on the whether the reference audio signal is detected in an ambient audio signal captured from the ambient environment, and take action based on the determination. The state detection module 158 may output the reference audio signal during a communication session or before a communication session. For example, the state detection module may output the reference audio signal (using aa generated identification audio signal) and determine the state of the television 180 before facilitating an incoming communication session, such as a video call or voice command to the virtual assistant, or may output the reference audio signal and determine the state of the television 180 periodically as a preventative measure.

In some embodiments, the signal generation module 300 generates an identification audio signal to be used as the reference audio signal. In these embodiments, the reference audio signal is the identification audio signal or a combination of a network audio signal and the identification audio signal. In other embodiments, the communication system 120 uses the network audio signal as the reference audio signal, and the signal generation module 300 may be omitted.

The signal generation module 300, if present, generates an identification audio signal, which is a locally-generated audio signal with a unique audio signature. In some embodiments, the identification audio signal is a single pulse of a specific tonal frequency or multiple pulses of one or more tonal frequencies. The tonal frequency of each pulse may be near or above the upper limit of the audible frequency range to reduce a user's ability to hear the identification audio signal if output into an ambient environment of the communication system 120. The duration of each pulse may be between a fraction of a millisecond or multiple seconds. In other embodiments, the identification audio signal is composed of multiple tonal frequencies of either simultaneous or time-multiplexed composition.

In some embodiments, the signal generation module 300 generates the identification audio signal based on a network audio signal received from the remote client 115. The communication system 120 may include a speech detector, which the signal generation module 300 may use to determine is the network audio signal contains user speech input. If the network audio signal contains user speech input, the signal generation module 300 generates the identification audio signal to mix with the user speech input to disguise the identification audio signal upon output by the television 180. In some embodiments, the signal generation module 300 mixes the identification audio signal with the network audio signal by matching the patterns and tonal frequencies of the user speech input. For example, the signal generation module 300 may generate the identification audio signal to be composed of multiple pulses at a common tonal frequency detected in the user speech input spaced apart in time to match a pattern of the user speech input.

In further embodiments, the signal generation module 300 may generate the identification audio signal to have an energy level that corresponds to a noise level of a real-time ambient audio signal captured in a real-time time interval by the microphone sub-system 124. For instance, the communication system 120 may include a noise level detector, which the signal generation module 300 may use to generate the identification audio signal to be buried in a noise floor of the ambient environment. Further, in some embodiments, the communication system 120 may request the volume level from the television, map the volume level to the detected noise level, and generate the identification audio signal to be buried in the noise floor based on the mapping. For example, the signal generation module 300 may bury the identification audio signal by setting the energy level of the identification audio signal to below the energy level of a real-time ambient audio signal. In another example, the signal generation module 300 may construct the identification audio signal so that a signal-to-noise ratio (SNR) of the identification audio signal to the noise level of the real-time ambient audio signal of the room is kept constant. In some embodiments, the signal generation module 300 only enforces the constant SNR in specific frequency bands to achieve a similar level of detection robustness in multiple environments. Further, the signal generation module 300 may adjust the energy level of the identification audio signal in real-time according to a noise level of the ambient environment detected by the microphone sub-system 124. In other embodiments, the signal generation module 300 minimizes the SNR to the extent that the identification audio signal could still be extracted from an ambient audio signal if sent for output to the television 180 with the network audio signal.

The comparison module 305 uses a variety of techniques to compare an ambient audio signal and a reference audio signal (or, collectively, audio signals) to check the state of the television 180. These techniques include correlation comparison, voice biometric comparison, signal presence detection, matched filtering, or a combination thereof. In some embodiments, when multiple client devices 115 are connected to the communication system 120 for a communication session, such as a voice/video call, the comparison module 305 may combine network audio signals received from the multiple remote client devices 115 and/or an identification audio signal as the reference audio signal and compare the reference audio signal to an ambient audio signal detected via the microphone sub-system 124.

In an embodiment using a correlation comparison technique, the comparison module 305 performs a correlation between the reference audio signal and the ambient audio signal to determine a similarity measure of the audio signals. In these embodiments, a high similarity measure (e.g., above a threshold value) indicates that the reference audio signal and the ambient audio signal match and the television 180 is still outputting remote audio from the communication session, while a low similarity measure (e.g., below a threshold value) indicates that the reference audio signal and the ambient audio signal do not match. The comparison module 305 sends a comparison result indicating whether or not the reference audio signal and the ambient audio signal match to the control module 310.

In instances where the comparison module 305 utilizes the network audio signal 220 as the reference audio signal, the comparison module 305 may use a voice biometric comparison technique, in which the comparison module 305 obtains biometric identifiers for the reference audio signal and the ambient audio signal. Each biometric identifier for the audio signals comprises a representation of features of the voice signal of each audio signal that are strongly correlated to a particular speaker that is a source of the voice signal. Thus, biometric identifiers computed from different audio signals from the same speaker typically match, while biometric identifiers computed from different audio signals from different speakers typically do not match. In some embodiments, the comparison module 305 determines a biometric identifier for each audio signal by using a biometric identification algorithm, such as a log likelihood metric combined with either Mel Frequency Cepstral Coefficients (MFCC) or Perceptual Linear Prediction (PLP). In another embodiment, the comparison module 305 calculates a Euclidean distance between vectors representing the reference audio signal and the ambient audio signal to determine if the audio signals biometrically match to the same user rather than determining a biometric identifier for comparing the audio signals. The comparison module 305 sends a comparison result indicating whether or not the reference audio signal and the ambient audio signal match to the control module 310.

In an embodiment using signal presence detection, the comparison module 305 analyzes the ambient audio signal to determine if the reference audio signal is contained within or sufficiently matches the ambient audio signal. In some embodiments, the comparison module 305 determines specific frequency bands to perform pattern analysis of the audio signals on. The specific frequency bands may correspond to all frequency bands including tonal frequencies of the reference audio signal, and the comparison module 305 may only perform pattern analysis on the reference audio signal and the ambient audio signal in the specific frequency bands. The comparison module 305 may performs pattern analysis on the audio signals by analyzing the audio signals to determine if the audio signals have the same or substantially similar pattern of frequency components, and the comparison module 305 may perform pattern analysis in either the frequency domain or the time domain. The comparison module determines a similarity measure for the audio signals based on the pattern analysis. If the comparison module 305 determines the reference audio signal is present in the ambient audio signal (i.e., the similarity measure meets a similarity threshold), the comparison module 305 sends a comparison result indicating that the reference audio signal and the ambient audio signal match to the control module 310. Otherwise, the comparison module 305 sends a comparison result indicating that the reference audio signal and the ambient audio signal do not match.

In an embodiment using matched filtering, the comparison module 305 to determine if the reference audio signal is contained within the ambient audio signal. In this embodiment, the comparison module 305 correlates the reference audio signal with the ambient audio signal to detect the presence of the reference audio signal in the ambient audio signal. If the comparison module 305 determines the reference audio signal is present in the ambient audio signal (i.e., the output of the matched filter is above a threshold), the comparison module 305 sends a comparison result indicating that the reference audio signal and the ambient audio signal match to the control module 310. Otherwise, the comparison module 305 sends a comparison result indicating that the reference audio signal and the ambient audio signal do not match.

In some embodiments, the comparison module 305 performs one or more of the comparison techniques frame-by-frame to determine whether the reference audio signal and the ambient audio signal match in each frame, where each frame comprises a time-localized portion of the audio signal. The comparison module 305 determines a match confidence score based on whether or not each set of corresponding frames match and indicates that the reference audio signal and the ambient audio signal match if the confidence score exceeds a threshold score over a predefined window of consecutive frames. In some embodiments, the comparison module 305 combines the comparison techniques using network audio signals 220 and a locally generated identification audio signal to determine if the reference audio signal and the ambient audio signal match. In these embodiments, the comparison module 305 may use the comparison methods sequentially or simultaneously. For example, the comparison module 305 may use a first comparison technique to obtain one comparison result, and if the comparison result indicates that the audio signals do not match, the comparison module 305 may use a second comparison technique to compare the audio signals and generate a comparison result based on the second comparison technique. In another example, the comparison module 305 may use the first and second comparison technique at the same time. If each comparison technique indicates a match, the comparison module 305 may send a comparison result to the control module 310 that the audio signals match. If one or more of the comparison techniques indicate that the audio signals do not match, the comparison module 305 may send a comparison result indicating that the audio signals do not match.

The control module 310 receives a comparison result from the comparison module 305 and takes action based on the comparison result. A comparison result that the compared audio signals do not match indicates that the television 180 may be off or set to a different input 186 than the input connected to the communication system 120. The action the control module takes may depend on whether the communication system 120 is facilitating an ongoing communication session. Ongoing communication sessions may include voice/video calls, the recording of multimedia messages, or interactions with the virtual assistant.

During an ongoing communication session, when the control module 310 receives a comparison result indicating that the compared audio signals do not match, the control module 310 may end the communication session via the communication module 154 or generate a visual or audio alert indicative of the determination that a communication session may be connected. For example, the alert may present a prompt via the user interface module 152 presenting an option to continue the communication session. The control module 310 may automatically end the communication session without receiving a confirmation from the front end user that the voice/video call may continue within a predefined time period. Further, the control module 310 may cause the communication system 120 to facilitate the communication session via internal speakers and/or an internal display.

In some embodiments, when a communication session is not ongoing (i.e., before an incoming communication session or as a periodic check of the state of the television 180), the control module 310 may take action upon receiving a comparison result indicating that the compared audio signals do not match. In some embodiments, the control module 310 may send a command to the television 180 to configure the television to be able to output video and audio data of a communication session. In another embodiment, the control module 310 may switch audio output from the communication system 120 to internal speakers instead of the television 180 and/or video output to an internal display.

Comparison Processes

Figure 4:
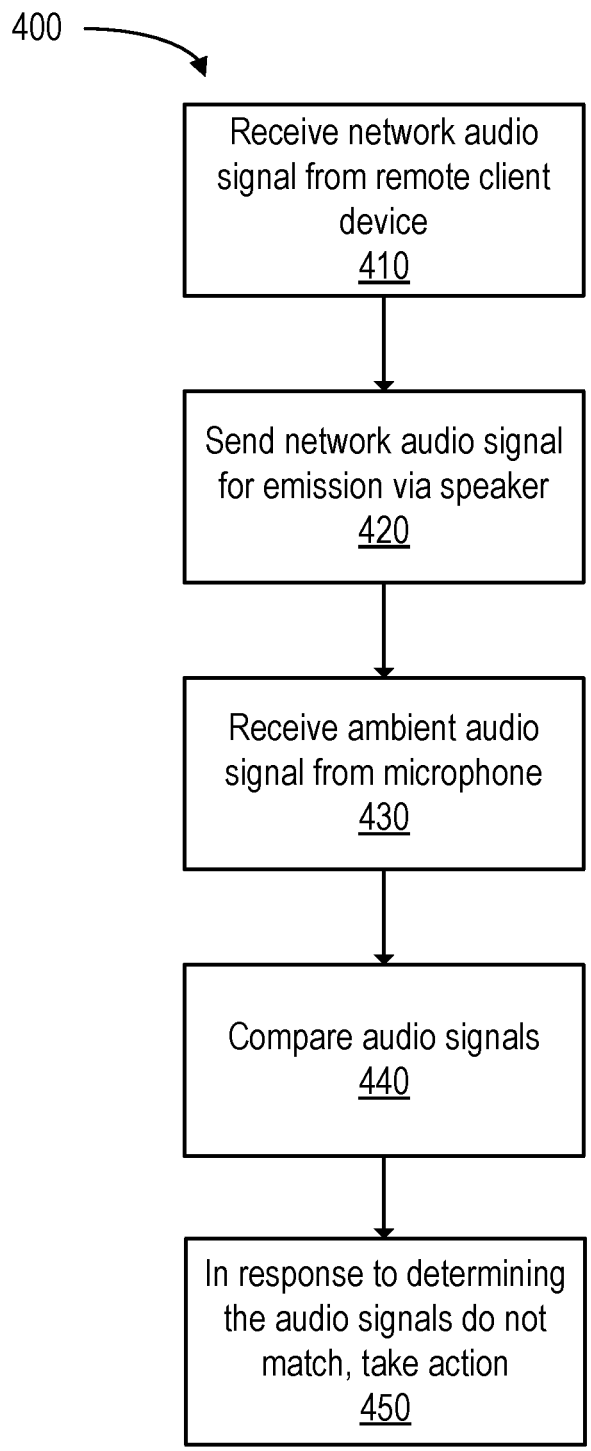
FIG. 4 is a flowchart illustrating a process for determining a state of a television connected to a communication system using a network audio signal as the reference audio signal, according to one embodiment.

FIG. 4 is a flowchart illustrating a process 400 for determining a state of a television connected to a communication system using a network audio signal as the reference audio signal, according to one embodiment. The communication system 120 receives 410 a network audio signal from a remote client device 115 via the network 110. If a communication session, such as a call, is in progress, the network audio signal may include the voice of a back end user or background noise from the location of the remote client device 115. The communication system 120 sends 420 the network audio signal for emission via a speaker 184. The speaker may be internal to the television 180 or the communication system 120 or may be an external speaker system connected to either the television 180 or the communication system 120.

The communication system 120 receives 430 an ambient audio signal via the microphone sub-system 124. In some embodiments, the communication system 120 performs signal processing on the ambient audio signal to remove excess noise or echoes. Once the audio signals have been received, the communication system 120 compares 440 the audio signals to determine if the audio signals match. The communication system 120 may compare the audio signals using a correlation comparison, a voice biometric comparison, matched filtering, or a combination of comparison techniques. In some embodiments, the communication system 120 may compare the audio signals frame-by-frame to determine if the audio signals match. In response to determining the audio signals do not match, the communication system 120 takes 450 an action with respect to the communication sessions. Actions may include ending the communication session, generating a notification indicating that the communication session is ongoing, generating a message requesting confirmation to continue the communication session, or switching audio to internal speakers of the communication system 120.

Figure 5:
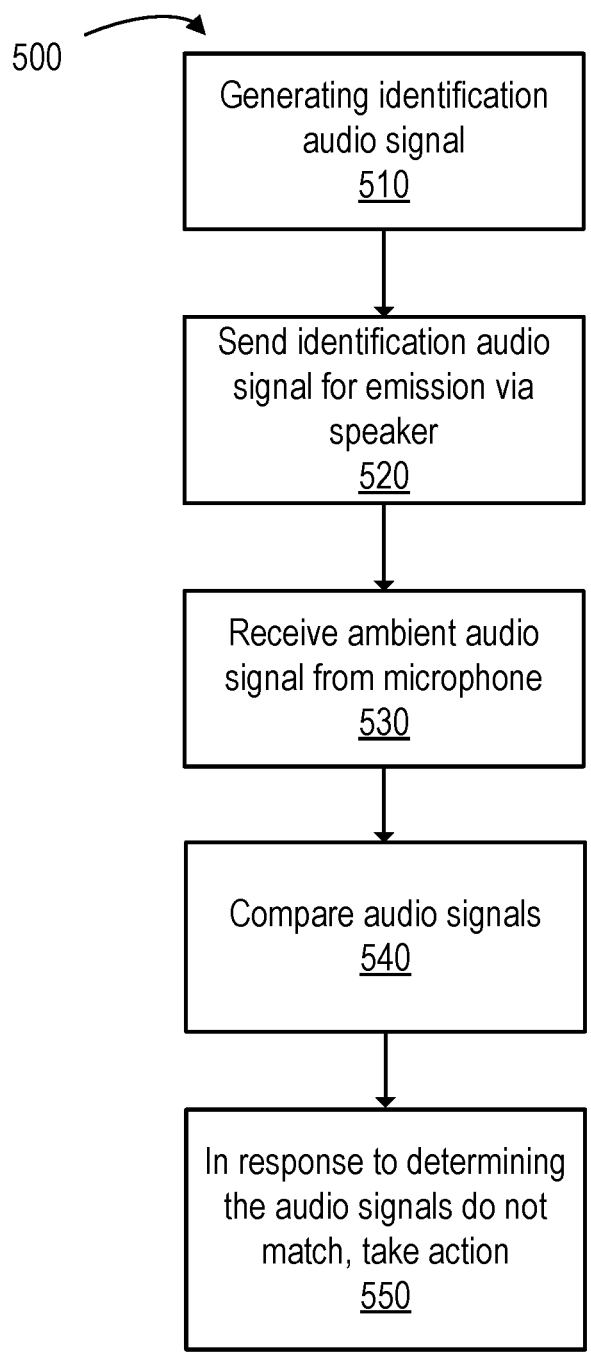
FIG. 5 is a flowchart illustrating a process for determining a state of a television connected to a communication system using locally-generated identification audio signal as the reference audio signal, according to one embodiment.

FIG. 5 is a flowchart illustrating a process 500 for determining a state of a television connected to a communication system using a locally-generated identification audio signal as the reference audio signal, according to one embodiment. The communication system 120 generates 510 an identification audio signal. In some embodiments, the communication system 120 generates the identification audio signal based on user speech input detected via network audio signal received from the remote client device 115 or a noise level of a real-time ambient audio signal. The communication system 120 sends 520 the identification audio signal for emission via a speaker 184. The speaker may be internal to the television 180 or the communication system 120 or may be an external speaker system connected to either the television 180 or the communication system 120. The communication system 120 may send the identification audio signal during a communication session facilitated by the communication system 120, before facilitating an incoming communication session (i.e., after receiving a voice command for the virtual assistant or a notification of an incoming voice/video call), or periodically while a communication session is not ongoing to prevent facilitating a communication session with the television 180 is the television 180 is not properly configured.

The communication system 120 receives 530 an ambient audio signal via the microphone sub-system 124. In some embodiments, the communication system 120 performs signal processing on the ambient audio signal to remove excess noise or echoes. Once the ambient audio signal has been received, the communication system 120 compares 540 the audio signals to determine if the audio signals match. The communication system 120 may compare the audio signals using a correlation comparison, a signal presence detection, matched filtering, or a combination of comparison techniques. In some embodiments, the communication system 120 may compare the audio signals frame-by-frame to determine if the audio signals match. In response to determining the audio signals do not match, the communication system 120 takes 550 an action. If a communication session is ongoing, the communication system 120 may take actions such as ending the communication session, generating a notification indicating that the communication session is ongoing, generating a message requesting confirmation to continue the communication session, or switching audio to internal speakers of the communication system 120. If a communication session is not ongoing, the communication system 120 may facilitate an incoming communication session using internal speakers and/or an internal display or send a command to the television 180 to properly configure the television 180 for future communication sessions facilitated by the communication system.

In some embodiments, the communication system 120 uses a combination of the process 400 detailed in FIG. 4 and the process 500 detailed in FIG. 5. For example, the communication system 120 may employ both processes simultaneously and take action if the communication system 120 determines, by either process, that the audio signals do not match. In other embodiments, the communication system 120 may employ the processes sequentially. For example, the communication system 120 may employ the process 400 of FIG. 4, and if the communications system 120 determines that the audio signals do not match, the communication system 120 employs the process of FIG. 5. Otherwise, the communications system 120 may only employ the process 400 of FIG. 4 if the audio signals do match. Alternatively, the communication system 120 may employ the process 500 of FIG. 5 before the process 400 of FIG. 4. Further, in some embodiments, the communications system 120 may use the process 400 of FIG. 4 if the network audio signal contains user speech input and otherwise use the process of FIG. 5 with the locally-generated identification audio signal.

In other embodiments, the communication system 120 may use a combination of data from other sources together with audio data to predict the state of the television 180. For example, in an embodiment, the communication system 120 may first request the television's state via a CEC command. In an embodiment, the communication system 120 only proceeds to detect the television state based on the audio signals if the state cannot be determined via the CEC command. Otherwise, if the communication system 120 can confirm via the CEC command that the television 180 is coupled to the communication system 120 and set to the appropriate source, the communication system 120 then sends audio and video to the television during a communication session. In another embodiment, the communication system 120 may automatically send the audio and to the television 180 if a call (or other communication session) is answered using a remote control but applies the audio-based technique described above if the call is answered via a voice command. In another embodiment, the communication system 120 may output an audio and/or visual notification to the television 180 upon establishing a communication session (or before establishing the communication session) and request confirmation from the user via the remote control to confirm that the user detected the notification. If the confirmation is not received via the remote control, the communication system 120 may switch to using the integrated speakers or may use the audio-based detection method described above to detect the television state. In further embodiments, a different combination of multiple different signals may be used to detect the television state.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at a communication system, a request to establish a communication session with a local communication device via a network;
   outputting, by the communication system, a reference audio signal to a locally connected audio output device, wherein the reference audio signal comprises a locally-generated identification audio signal, the identification audio signal comprising multiple pulses of one or more tonal frequencies of simultaneous or time-multiplexed composition;
   receiving, at the communication system, an ambient audio signal via a local microphone;
   comparing, by the communication system, the reference audio signal output by the communication system and the ambient audio signal to determine if the reference audio signal and the ambient audio signal meet a similarity threshold; and
   initiating, by the communication system, an action with respect to the communication session based on the comparison.

2. The method of claim 1, wherein the pulses are near or above the audible frequency range.

3. The method of claim 2, wherein the reference audio signal is buried in a noise floor of an ambient environment around the local communication device.

4. The method of claim 1, wherein comparing the reference audio signal and the ambient audio signal comprises:
   performing a cross correlation on between the ambient audio signal and the reference audio signal to obtain a similarity measure.

5. The method of claim 1, wherein comparing the reference audio signal and the ambient audio signal comprises:
   performing signal presence detection on each of the reference audio signal and the ambient audio signal, the signal presence detection including frequency composition and modulation pattern analysis; and
   in response to determining that the ambient audio signal includes the reference audio signal, obtaining a similarity measure indicating that the reference audio signal and the ambient audio signal meet a similarity threshold.

6. A non-transitory computer-readable storage medium comprising instructions executable by a processor, the instructions comprising:
   instructions for receiving, at a communication system, a request to establish a communication session with a local communication device via a network;
   instructions for outputting, by the communication system, a reference audio signal to a locally connected audio output device, wherein the reference audio signal comprises a locally-generated identification audio signal, the identification audio signal comprising multiple pulses of one or more tonal frequencies of simultaneous or time-multiplexed composition;
   instructions for receiving, at the communication system, an ambient audio signal via a local microphone;
   instructions for comparing, by the communication system, the reference audio signal output by the communication system and the ambient audio signal to determine if the reference audio signal and the ambient audio signal meet a similarity threshold; and
   instructions for initiating, by the communication system, an action with respect to the communication session based on the comparison.

7. The non-transitory computer-readable storage medium of claim 6, wherein the pulses are near or above the audible frequency range.

8. The non-transitory computer-readable storage medium of claim 6, wherein the reference audio signal is buried in a noise floor of an ambient environment around the local communication device.

9. The non-transitory computer-readable storage medium of claim 6, wherein the instructions for comparing the reference audio signal and the ambient audio signal comprise:
   instructions for performing a cross correlation on between the ambient audio signal and the reference audio signal to obtain a similarity measure.

10. The non-transitory computer-readable storage medium of claim 6, wherein the instructions for comparing the reference audio signal and the ambient audio signal comprise:
   instructions for performing signal presence detection on each of the reference audio signal and the ambient audio signal, the signal presence detection including frequency composition and modulation pattern analysis; and in response to determining that the ambient audio signal includes the reference audio signal, instructions for obtaining a similarity measure indicating that the reference audio signal and the ambient audio signal meet a similarity threshold.

11. A computer system comprising:

a computer processor; and a non-transitory computer-readable storage medium storing instructions that, when executed by the computer processor, causes the computer processor to perform actions comprising:

receiving, at the computer system, a request to establish a communication session with a local communication device via a network;

outputting, by the computer system, a reference audio signal to a locally connected audio output device, wherein the reference audio signal comprises a locally-generated identification audio signal, the identification audio signal comprising multiple pulses of one or more tonal frequencies of simultaneous or time-multiplexed composition;

receiving, at the computer system, an ambient audio signal via a local microphone;

comparing, by the computer system, the reference audio signal output by the computer system and the ambient audio signal to determine if the reference audio signal and the ambient audio signal meet a similarity threshold; and initiating, by the computer system, an action with respect to the communication session based on the comparison.

\* \* \* \* \*